United States Patent
Tagawa et al.

(10) Patent No.: US 10,018,131 B2
(45) Date of Patent: Jul. 10, 2018

(54) FUEL VAPOR PROCESSING APPARATUS

(71) Applicants: AISAN KOGYO KABUSHIKI KAISHA, Obu-shi, Aichi-ken (JP); TOYOTA JIDOSHA KABUSHIKI KAISHA, Toyota-shi, Aichi-ken (JP)

(72) Inventors: Naoyuki Tagawa, Nagoya (JP); Minoru Akita, Ama (JP); Yoshikazu Miyabe, Obu (JP); Tatsuhiko Akita, Okazaki (JP); Yuusaku Nishimura, Toyota (JP); Keita Fukui, Fujinomiya (JP)

(73) Assignees: AISAN KOGYO KABUSHIKI KAISHA, Obu-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 15/379,904

(22) Filed: Dec. 15, 2016

(65) Prior Publication Data

US 2017/0167413 A1 Jun. 15, 2017

(30) Foreign Application Priority Data

Dec. 15, 2015 (JP) ................................ 2015-244328

(51) Int. Cl.
*F02D 41/00* (2006.01)
*F02M 25/08* (2006.01)
(Continued)

(52) U.S. Cl.
CPC ...... *F02D 41/003* (2013.01); *B60K 15/03519* (2013.01); *F02D 41/004* (2013.01); *F02D 41/0042* (2013.01); *F02D 41/1473* (2013.01); *F02M 25/0836* (2013.01); *F02D 41/1454* (2013.01)

(58) Field of Classification Search
CPC ............... F02D 41/003; F02D 41/1473; F02D 41/0042; F02D 41/004; F02D 41/1454; B60K 15/03519; F02M 25/0836
See application file for complete search history.

(56) References Cited

U.S. PATENT DOCUMENTS 5,216,991 A * 6/1993 Iida .................... F02D 31/004
123/339.23
8,640,676 B2 2/2014 Horiba et al.
(Continued)

FOREIGN PATENT DOCUMENTS

DE 10 2014 017 159 A1 5/2015
DE 10 2014 018 041 A1 6/2015
(Continued)

OTHER PUBLICATIONS

German Patent Application No. 10 2016 123 901.1 Office Action dated May 22, 2017 (8 pages).

*Primary Examiner* — Joseph Dallo
(74) *Attorney, Agent, or Firm* — Conley Rose, P.C.

(57) ABSTRACT

A fuel vapor processing apparatus includes an adsorbent canister, a vapor path connecting the adsorbent canister to a fuel tank, and a flow control valve disposed in the vapor path. The flow control valve is kept closed while a movement distance of a valve body from a predetermined initial position toward a valve opening direction is less than a predetermined distance. A control unit comprising part of the apparatus is configured to set a valve opening speed of the flow control valve to a first speed under a condition where the movement distance of the valve body is less than the predetermined distance, and to set the valve opening speed of the flow control valve to a second speed lower than the first speed under a condition where the movement distance of the valve body is greater than the predetermined distance.

14 Claims, 7 Drawing Sheets

(51) Int. Cl.
    *B60K 15/035*    (2006.01)
    *F02D 41/14*     (2006.01)

(56) References Cited

U.S. PATENT DOCUMENTS

| | | |
|---|---|---|
| 9,284,923 B2 * | 3/2016 | Kimoto .............. F02M 25/0836 |
| 9,421,490 B2 | 8/2016 | Kimoto et al. |
| 2003/0074958 A1 * | 4/2003 | Nagasaki ........... F02M 25/0818 |
| | | 73/114.41 |
| 2009/0308359 A1 * | 12/2009 | Wang ................. F02M 25/0836 |
| | | 123/520 |
| 2011/0114062 A1 * | 5/2011 | Wang ................... F02D 41/003 |
| | | 123/406.24 |
| 2011/0203554 A1 * | 8/2011 | Horiba ................ F02D 41/0032 |
| | | 123/520 |
| 2011/0220071 A1 | 9/2011 | Horiba et al. |
| 2011/0315241 A1 * | 12/2011 | Yasuda ................. F16K 24/044 |
| | | 137/409 |
| 2013/0206115 A1 * | 8/2013 | Kragh .................... F02M 31/20 |
| | | 123/519 |
| 2014/0102420 A1 * | 4/2014 | Kimoto .............. F02M 25/0836 |
| | | 123/520 |
| 2015/0143996 A1 * | 5/2015 | Kimoto .............. B01D 53/0454 |
| | | 96/114 |
| 2015/0144111 A1 | 5/2015 | Akita et al. |
| 2015/0159598 A1 | 6/2015 | Tagawa et al. |
| 2016/0031318 A1 * | 2/2016 | Shimokawa ....... F02M 25/0854 |
| | | 206/0.7 |

FOREIGN PATENT DOCUMENTS

| | | |
|---|---|---|
| JP | 2011-256778 A | 12/2011 |
| JP | 2015-102009 A | 6/2015 |
| JP | 2015-102020 A | 6/2015 |

\* cited by examiner

FUEL VAPOR PROCESSING APPARATUS

CROSS-REFERENCE TO RELATED APPLICATIONS

This application claims priority to Japanese patent application serial number 2015-244328, filed Dec. 15, 2015, the entire contents of which are incorporated herein by reference for all purposes.

STATEMENT REGARDING FEDERALLY SPONSORED RESEARCH OR DEVELOPMENT

Not applicable.

BACKGROUND

This disclosure relates to a fuel vapor processing apparatus.

Japanese Laid-Open Patent Publication No. 2015-102020 discloses a fuel vapor processing apparatus having an adsorbent canister capable of adsorbing fuel vapor. In the fuel vapor processing apparatus, the fuel vapor vaporized in a fuel tank is introduced into the adsorbent canister and is adsorbed therein. Then, the fuel vapor is purged from the adsorbent canister and is supplied to an internal combustion engine (also, referred to as engine) during a purge operation. The fuel vapor processing apparatus further includes a flow control valve in a vapor path connecting the fuel tank to the adsorbent canister. The flow control valve is usually closed and is opened as necessary for controlling a fluid communication through the vapor path.

When the purge operation is performed, the fuel vapor adsorbed in the adsorbent canister is purged and is supplied to the engine. The fuel vapor supplied to the engine may affect an air-fuel ratio in the engine, so a correction of the air-fuel ratio in the engine is performed during the purge operation.

However, when the flow control valve is opened, the fuel vapor flows through the vapor path from the fuel tank toward the adsorbent canister depending on a difference between a pressure in the fuel tank and that in the adsorbent canister. Such flow of the fuel vapor may affect the corrected air-fuel ratio. Accordingly, there has been a need for improved fuel vapor processing apparatuses.

BRIEF SUMMARY

In one aspect of this disclosure, a fuel vapor processing apparatus includes an adsorbent canister, a vapor path connecting the adsorbent canister to a fuel tank, and a flow control valve disposed in the vapor path. The flow control valve is kept closed while a movement distance of a valve body relative to a valve seat from a predetermined initial position toward a valve opening direction is less than a predetermined distance. An opening amount of the flow control valve increases in response to an increase in the movement distance of the valve body under a condition where the movement distance of the valve body is greater than the predetermined distance. A control unit comprising part of the fuel vapor processing apparatus is configured to set a valve opening speed of the flow control valve at a start of valve opening to a first speed under a condition where the movement distance of the valve body from the predetermined initial position is less than the predetermined distance, and to set the valve opening speed of the flow control valve to a second speed lower than the first speed under a condition where the movement distance of the valve body from the predetermined initial position is greater than the predetermined distance.

DETAILED DESCRIPTION

Each of the additional features and teachings disclosed above and below may be utilized separately or in conjunction with other features and teachings to provide improved fuel vapor processing apparatuses. Representative examples, which utilize many of these additional features and teachings both separately and in conjunction with one another, will now be described in detail with reference to the attached drawings. The detailed description disclosed herein is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
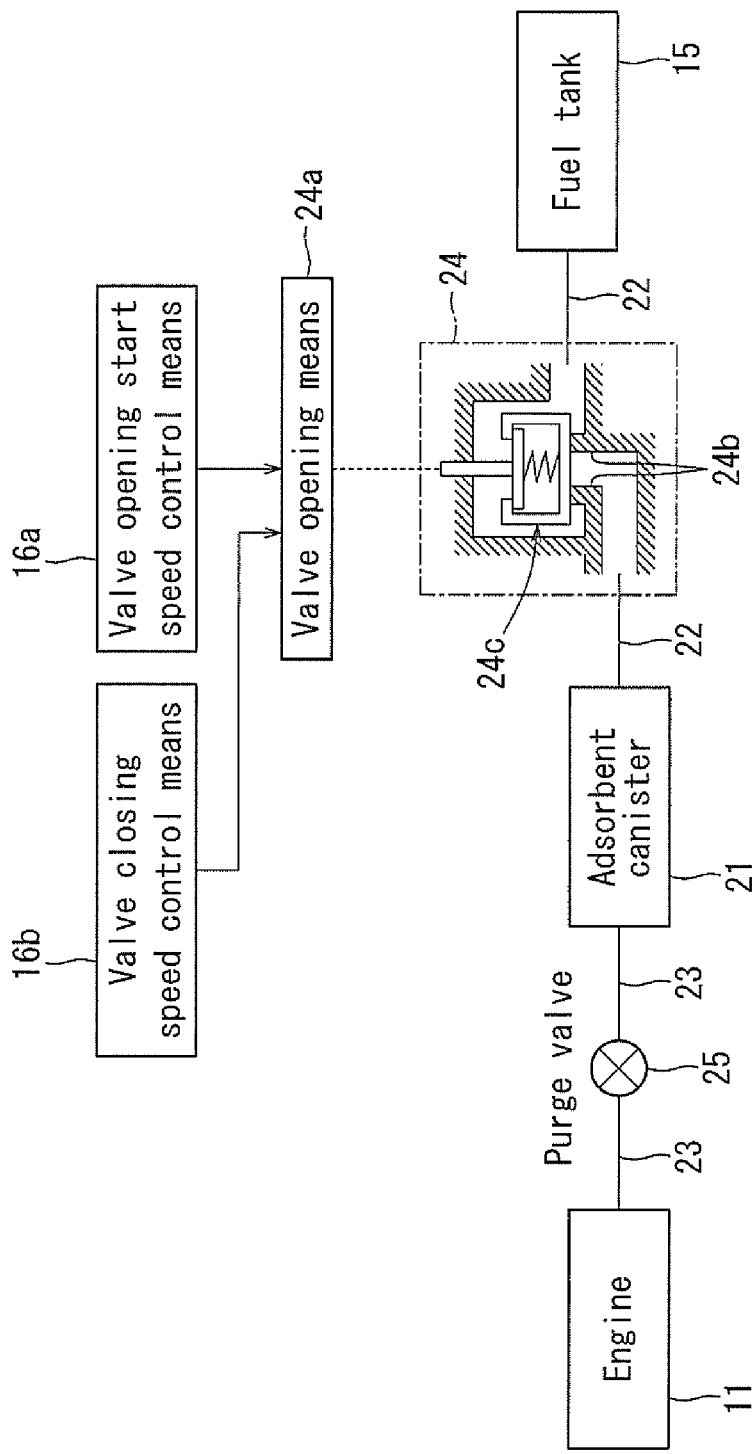
FIG. 1 is a block diagram of a fuel vapor processing apparatus according to a first embodiment.

FIG. 1 is a schematic view of a fuel vapor processing apparatus according to a first embodiment. In this apparatus, a fuel vapor vaporized in a fuel tank 15 is introduced into an adsorbent canister 21 through a vapor path 22 and is adsorbed in the adsorbent canister 21. Then, the fuel vapor adsorbed in the adsorbent canister 21 is purged and is supplied to an engine body 11 via a purge path 23 and a purge valve 25. The vapor path 22 is provided with a closing valve 24 (also, referred to as "flow control valve") that is opened and closed by a valve opening means 24a. The closing valve 24 includes a valve seat 24b and a valve body 24c and is configured to be closed while a movement distance of the valve body 24c relative to the valve seat 24b from an initial position toward a valve opening direction is equal to or less than a predetermined value. The closing valve 24 may be composed of a globe valve having the valve seat 24b facing in a moving direction of the valve body 24c as shown in FIG. 1. Alternatively, the closing valve 24 may be comprised of other types of valves such as a ball valve in which a flow passage is opened and closed by rotating a ball having a through-hole. The valve opening means 24a is connected to a control unit 16 (also referred to as "engine control unit (ECU)"). The control unit 16 includes a microcomputer composed of various electronic components such as a CPU and a memory where the microcomputer is configured to perform functions as a valve opening speed control means 16a and a valve closing speed control means 16b, based on specific algorithms and programs stored in the memory.

The valve opening speed control means 16a controls a speed of opening the closing valve 24 at the time of starting a valve opening operation. Specifically, a valve opening speed of the closing valve 24 at the time of starting the valve opening is set to a first speed under a closed condition where the movement distance of the valve body 24c in the closing valve 24 is equal to or less than the predetermined value, and is set to a second speed lower than the first speed under an open condition where the movement distance of the valve body 24c in the closing valve 24 is greater than the predetermined value. Furthermore, while the valve opening speed is the second speed, an opening amount of the closing valve 24 is increased by a predetermined amount at a cycle longer than a control cycle of a feedback control of the air-fuel ratio of the engine.

The valve closing speed control means 16b controls a valve closing speed of the closing valve 24 during closing the closing valve 24. Specifically, the valve closing speed of the closing valve 24 is equal to the valve opening speed of the closing valve 24 under a condition where the closing valve 24 is in a closed state.

Figure 2:
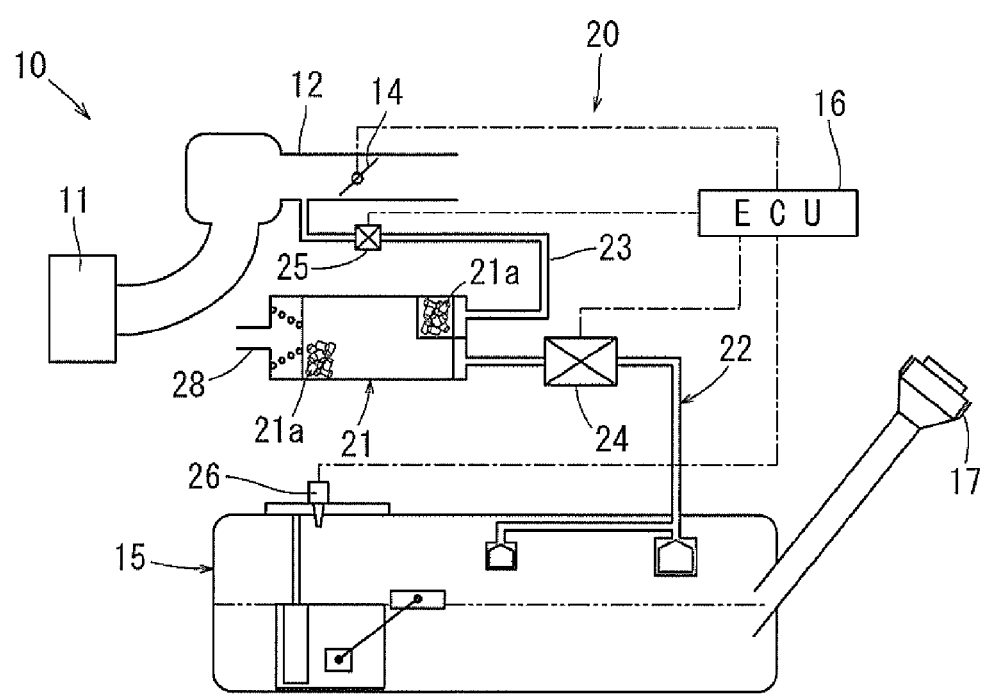
FIG. 2 is a schematic diagram of an engine system according to the first embodiment.

FIG. 2 is a schematic view of an engine system 10 according to the first embodiment. In the engine system 10, a gas mixture of air and fuel is supplied to the engine body 11 via an intake path 12. A flow rate of the air is controlled by a throttle valve 14, and a flow rate of the fuel is controlled by a fuel injection valve (not shown) that is supplied with the fuel from the fuel tank 15. The throttle valve 14 and the fuel injection valve are connected to the control unit 16. The throttle valve 14 outputs signals relating to an opening amount of the throttle valve 14 to the control unit 16. The control unit 16 controls an open time of the fuel injection valve.

In the fuel vapor processing apparatus 20, the vapor path 22 connects the fuel tank 15 to the adsorbent canister 21 such that the fuel vapor generated during refueling or vaporized in the fuel tank 15 is introduced into and is adsorbed in the adsorbent canister 21. The fuel vapor adsorbed in the adsorbent canister 21 is purged and is supplied to the intake path 12 downstream of the throttle valve 14 via the purge path 23. The closing valve 24 disposed in the vapor path 22 is composed of a step motor-type valve and is opened and closed by the valve opening means 24a, i.e., a step motor. The purge path 23 has the purge valve 25 for controlling a fluid communication through the purge path 23.

The adsorbent canister 21 is filled with an activated carbon 21a as adsorbent for trapping the fuel vapor flowing into the adsorbent canister 21. The adsorbent canister 21 is connected to an atmospheric path 28, which is open to the atmosphere and is configured to suction atmospheric air at a position near a fill opening 17 of the fuel tank 15. When starting the purge operation, negative pressure is applied to the adsorbent canister 21 via the purge path 23, and thus, atmospheric air flows into the adsorbent canister 21 through the atmospheric path 28 to compensate for the negative pressure. Consequently, the fuel vapor is purged from the adsorbent canister 21 and then is supplied to the engine body 11 via the purge path 23 and the intake path 12.

The control unit 16 receives various signals, e.g., detection signals from a pressure sensor 26, which is configured to detect an inner pressure of the fuel tank 15, in order to perform various operations for controlling the fuel vapor processing apparatus 20. Such operations include, for example, controlling the open time of the fuel injection valve, opening and closing each of the closing valve 24 and the purge valve 25.

Figure 3:
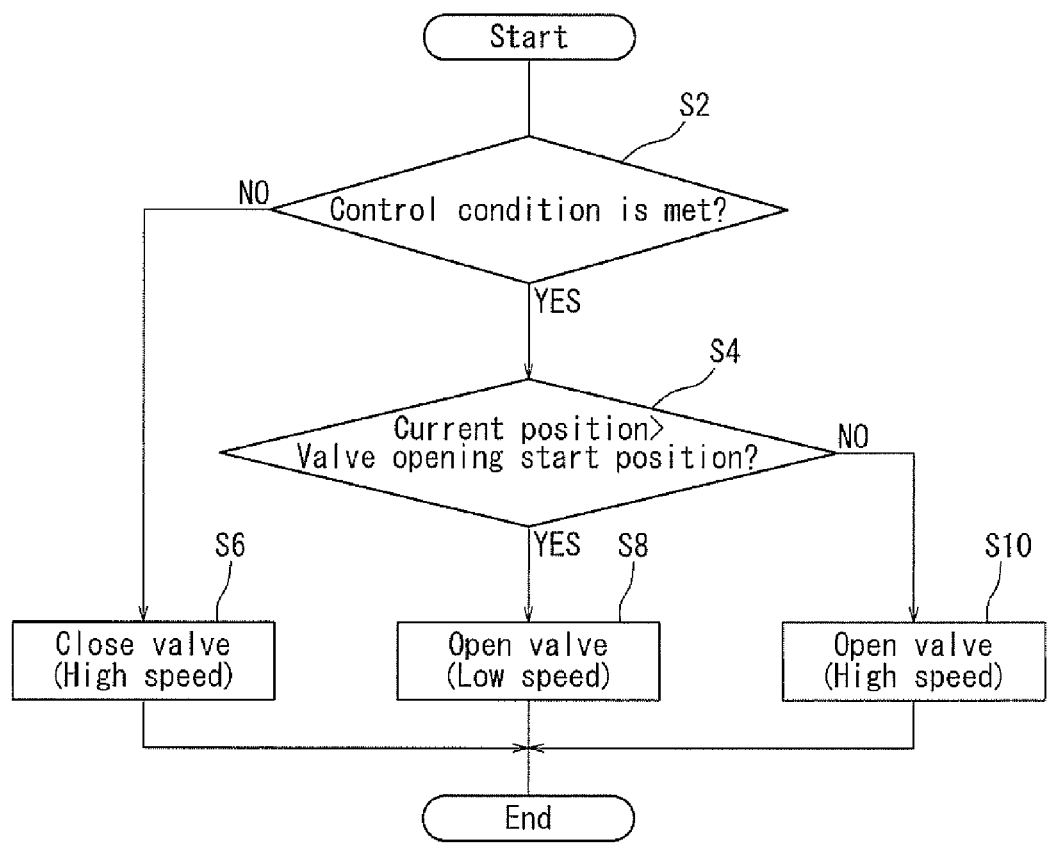
FIG. 3 is a flowchart showing a valve opening control of a flow control valve according to the first embodiment.

Next, the valve opening control of the closing valve 24 by the microcomputer of the control unit 16 will be described in reference to FIGS. 3 and 4. When this control is started, it is determined whether a valve opening control condition of the closing valve 24, i.e., a depressurizing control condition of the fuel tank 15, is met or not at a step S2. The valve opening control condition of the closing valve 24 includes whether the purge valve 25 is opened after a purge start signal is output, whether a purge flow amount is greater than a predetermine value, and whether the inner pressure of the fuel tank 15 is outside a predetermined range. When at least one of the conditions is met such that the valve opening control condition is met, the step S2 is determined as Yes. Then, it is determined whether a current valve opening position (valve opening amount) of the closing valve 24 is greater than a valve opening start position at a step S4. That is, it is determined whether the closing valve 24 is in the closed state or an open state at the step S4.

When the closing valve 24 is in the closed state, i.e., the valve opening position is less than the valve opening start position, the step S4 is determined as No, and then the closing valve 24 is operated to be open at the first speed that is relatively high at a step S10. The opening amount of the closing valve 24 under this condition varies as shown in a period "T1" in FIG. 4. During this period "T1", the closing valve 24 is operated to be open as rapidly as possible from a standby position located on a valve closed side distant from the valve opening start position by a steps toward the valve opening start position. Specifically, the valve opening start position has been previously detected and stored as learning value. While the closing valve 24 is in the closed state before starting the valve opening control, the closing valve 24 is kept at the standby position located on the valve closed side distant from the valve opening start position by α steps. Then, the closing valve 24 is operated from the standby position to the valve opening start position at high speed in response to the valve opening signals for the closing valve 24, so it is able to quickly open the closing valve 24. Furthermore, because the closing valve 24 is in the closed state during the period "T1", such high speed valve opening operation of the closing valve 24 does not induce a flow of the fuel vapor from the fuel tank 15 into the adsorbent canister 21.

When the closing valve 24 reaches the valve opening start position after the period "T1", the step S4 is determined as Yes, and the closing valve 24 is operated to be open at the second speed that is relatively low at a step S8. The opening amount of the closing valve 24 under this condition varies as shown in a period "T2" in FIG. 4. During the period "T2", the closing valve 24 is operated to be open at a low speed, i.e., the second speed, from the valve opening start position toward a target valve opening position. The valve opening speed of the closing valve 24 under this condition is set such that the opening amount of the closing valve 24 is increased by the predetermined amount at the cycle longer than the control cycle of the feedback control of the air-fuel ratio of the engine. When the closing valve 24 is operated to be open at the low speed, the feedback control of the air-fuel ratio can correct the air-fuel ratio in the engine without delay in response to an increase in the fuel vapor supplied to the engine, which is caused by the valve opening of the closing valve 24. Accordingly, disturbance of the air-fuel ratio in the engine caused by opening of the closing valve 24 can be suppressed.

Figure 4:
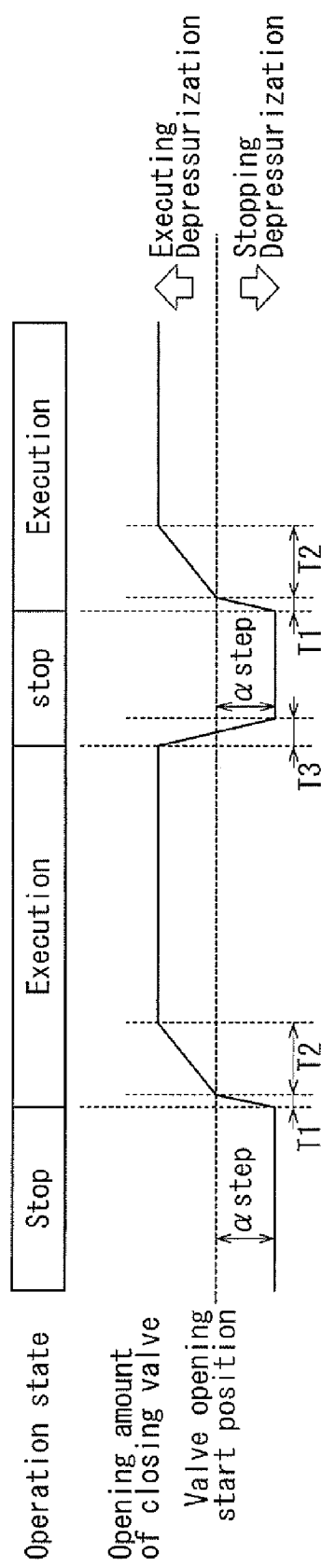
FIG. 4 is a time chart showing the valve opening control of the flow control valve according to the first embodiment.

FIG. 4 shows changes of the opening amount of the closing valve 24 in a linear fashion. However, the closing valve 24 is actually operated by the step motor, so the opening amount of the closing valve 24 precisely varies in a stepped manner. That is, the closing valve 24 is operated to be open such that the opening amount of the closing valve 24 is increased by the predetermined amount at the predetermined cycle.

In the first embodiment, the cycle of the feedback control of the air-fuel ratio is set at 16 milliseconds. An operating cycle of the step motor during the period "T1" (the closing valve 24 is in the closed state) is set at 6 milliseconds. The operating cycle of the step motor during the period "T2" (the closing valve 24 is in the open state) is set at 30 milliseconds. These cycles can be changed as necessary, and are not limited to the above-described time periods.

Figure 5:
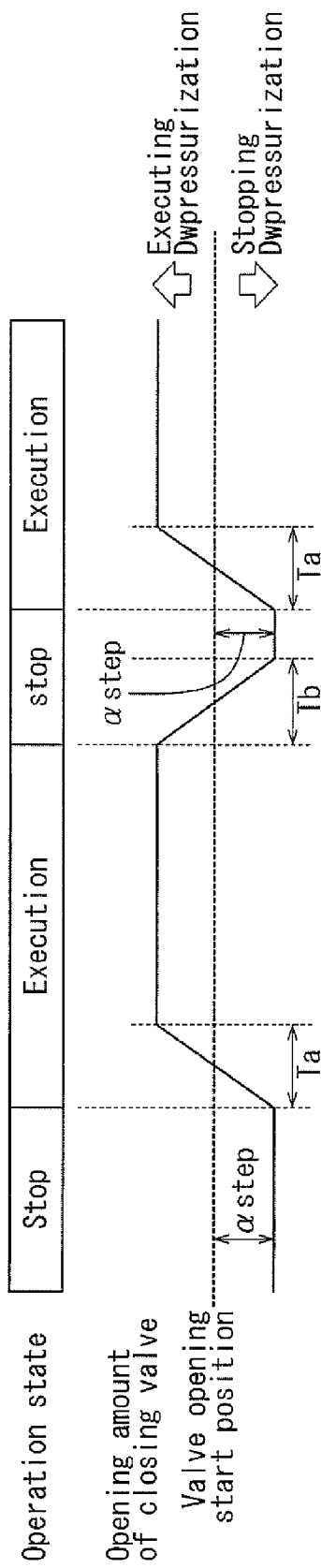
FIG. 5 is a time chart showing the valve opening control of the flow control valve in a prior art.

FIG. 5 shows changes of the opening amount of the closing valve 24 according to a prior art for comparison. When an opening operation of the closing valve 24 is started, the closing valve 24 is operated to be open from the standby position located on the valve closed side distant from the valve opening start position by a steps toward the target valve opening position at a relatively high speed during a period "Ta". The period "Ta" from a start of the opening operation of the closing valve 24 to a time when reaching the target valve opening position in the prior art is substantially equal to a period "T1+T2" in the first embodiment. However, an opening speed of the closing valve 24 during the period "Ta" in the prior art is lower than the first speed during the period "T1" and is higher than the second speed during the period "T2" in the first embodiment. Thus, until the closing valve 24 reaches the valve opening start position, the air-fuel ratio may shift toward a fuel lean side. And, while the closing valve 24 is operated from the valve opening start position toward the target valve opening position, the air-fuel ratio may shift toward a fuel rich side. Specifically, in the former case, the feedback control of the air-fuel ratio is performed to correct the air-fuel ratio toward the fuel lean side under an assumption that the purge operation toward the engine is carried out. However, the flow control valve is actually in the closed state, so the amount of the fuel vapor supplied to the engine is small. Thus, the air-fuel ratio may shift toward the fuel lean side. In the latter case, an increase rate of the fuel vapor supplied to the engine is high, so the feedback control of the air-fuel ratio is delayed with respect to changes of the air-fuel ratio. Thus, the air-fuel ratio may shift toward the fuel rich side.

In the first embodiment, when the valve opening control condition for the closing valve 24 is not met, the step S2 is determined as No, and then the closing valve 24 is operated to be closed at a constant speed that is relatively high at a step S6. A period "T3" in FIG. 4 shows a change of the opening amount of the closing valve 24 during this closing operation. In this closing operation, the closing valve 24 is operated to be closed as rapidly as possible from the target valve opening position to the standby position located on the valve closed side distant from the valve opening start position by a steps. Thus, when the valve opening control is stopped, the closing valve 24 can be closed quickly in order to prevent the fuel vapor in the fuel tank 15 from flowing toward the adsorbent canister 21. A valve closing speed of the closing valve 24 during this closing operation is equal to the valve opening speed of the closing valve 24 during the period "T1".

In a case of a valve closing operation in the prior art, the closing valve 24 is operated to be closed at a speed equal to the valve opening speed for the closing valve 24. Thus, the prior art may need a longer time for closing the closing valve 24 than the first embodiment, so the fuel vapor may flow into the adsorbent canister 21 from the fuel tank 15 unexpectedly.

Figure 6:
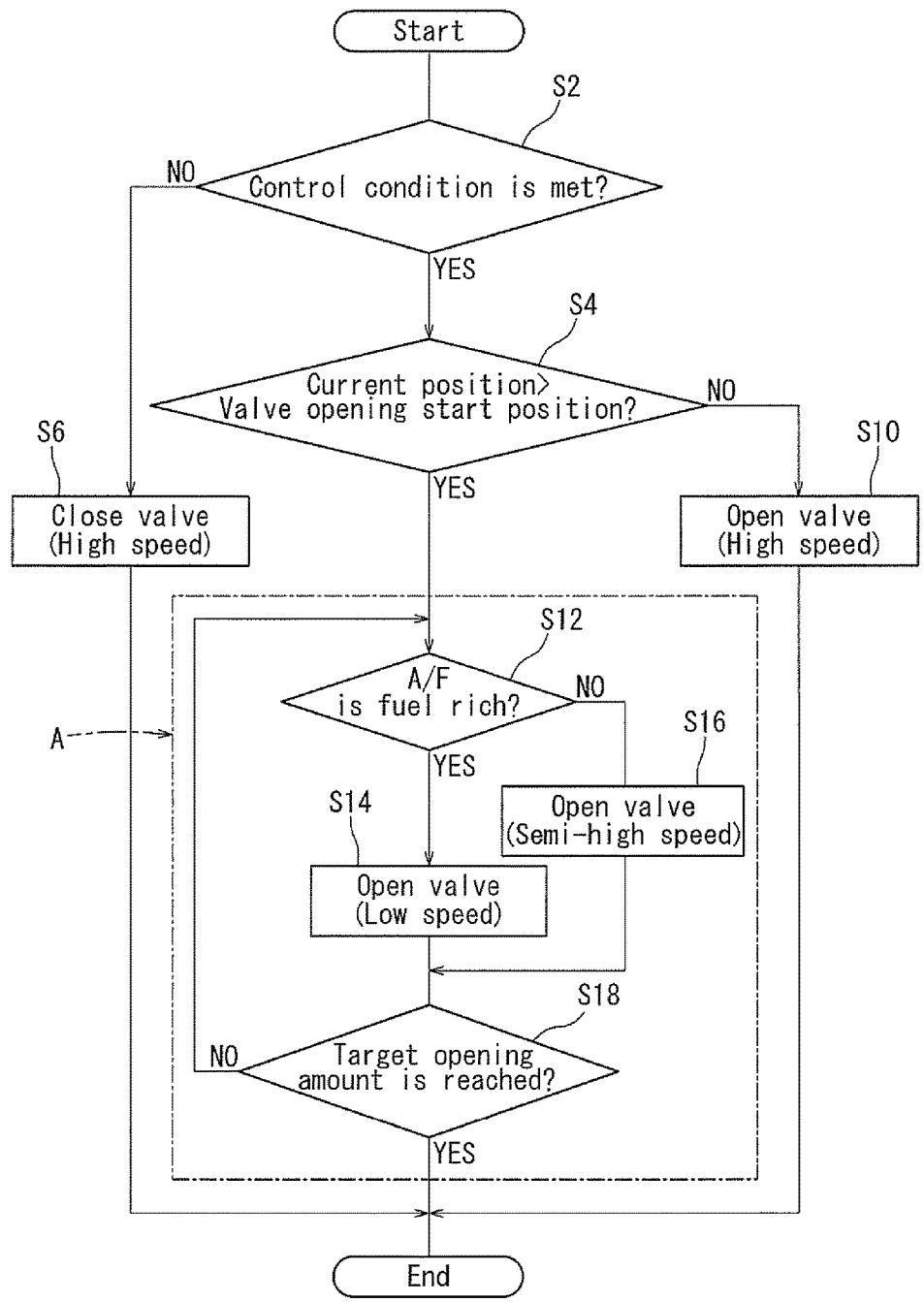
FIG. 6 is a flowchart showing the valve opening control of the flow control valve according to a second embodiment.

FIG. 6 shows a flowchart according to a second embodiment. The second embodiment is characterized in that the valve opening speed can be changed based on the air-fuel ratio while the closing valve 24 is operated to be open from the valve opening start position to the target valve opening position, that is, during the period "T2" in FIG. 4. Other configurations of the second embodiment are similar to those of the first embodiment, and thus, will not be described again.

The valve opening control according to the second embodiment includes some steps shown by "A" in FIG. 6 instead of the step S8 of the first embodiment. Thus, in the second embodiment, when the step S4 is determined as Yes after the closing valve 24 reaches the valve opening start position, it is determined whether the air-fuel ratio detected by an air-fuel ratio sensor (not shown) is in a fuel rich state at a step S12. When the air-fuel ratio is in the fuel rich state as shown by a period "T4" in FIG. 7, a step S12 is determined as Yes, and then the closing valve 24 is operated to be open at a relatively low speed. The valve opening speed of the closing valve 24 during the period "T4" is set to be slower than a responsiveness of the feedback control of the air-fuel ratio for the engine.

When the closing valve 24 is operated to be open at the low speed, the amount of the fuel vapor flowing into the adsorbent canister 21 via the closing valve 24 is relatively suppressed, so the air-fuel ratio gradually transitions into a fuel lean state. As the result, the step S12 is determined as No, and then the closing valve 24 is operated to be open at a semi-high speed at a step S16. The opening amount of the closing valve 24 and the air-fuel ratio during this semi-high speed operation are shown at a period "T5" in FIG. 7. The valve opening speed of the closing valve 24 during this period is set to be equal to or faster than the responsiveness of the feedback control of the air-fuel ratio. Thus, an increase rate of the fuel vapor flowing into the adsorbent canister 21 from the fuel tank 15 is raised, so the air-fuel ratio transitions into the fuel rich state. Then, the step S12 is determined as Yes again, and the valve opening speed of the closing valve 24 is changed to be low at a step S14. The opening amount of the closing valve 24 during this low speed operation is shown at a period "T6" in FIG. 7.

In the second embodiment, the operating cycle of the step motor during the periods of "T4" and "T6" is set at 30 milliseconds. The operating cycle of the step motor during the period "T5" is set at 10 milliseconds. These cycles can be changed as necessary, and are not limited to the above-described time periods.

Figure 7:
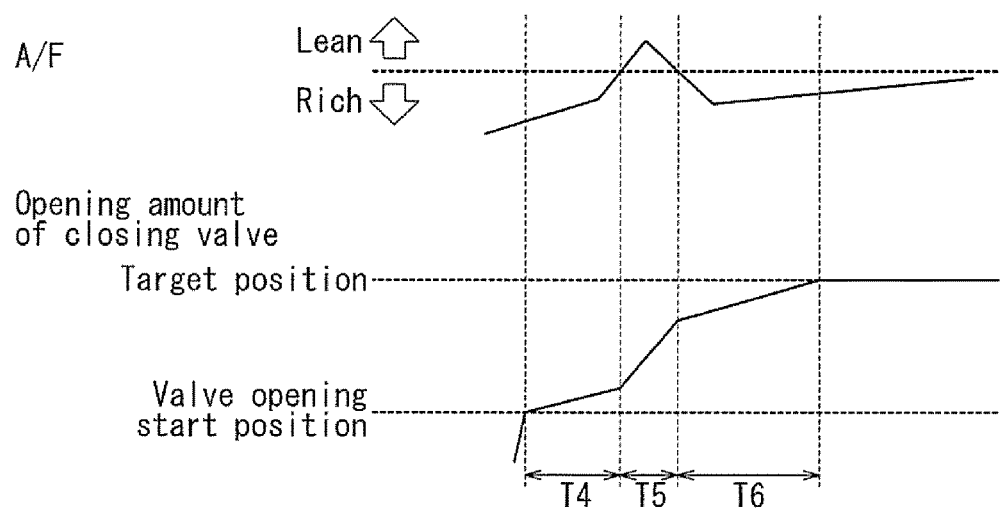
FIG. 7 is a time chart showing the valve opening control of the flow control valve according to the second embodiment.

The above-described operations are continued until the valve opening amount of the closing valve 24 reaches the target valve opening amount (a target position in FIG. 7). When the valve opening amount of the closing valve 24 reaches the target valve opening amount, a step S18 is determined as Yes, and the valve opening control for the closing valve 24 is finished.

The closing valve 24 can be operated to be open quickly to the target opening amount while keeping the air-fuel ratio on or around a theoretical air-fuel ratio by controlling the valve opening speed of the closing valve 24 at the start of valve opening according to the valve opening control of the second embodiment.

In the first embodiment, the operations of the step S4, the step S8 and the step S10 are performed by the valve opening speed control means 16a. The operation of the step S6 is performed by the valve closing speed control means 16b. In the second embodiment, the operations of the step S4, the steps S12 to S18 and the step 10 are performed by the valve opening speed control means 16a. The operation of the step S6 is performed by the valve closing speed control means 16b.

This disclosure can be modified without departing from the scope of the invention. For example, in the first embodiment, the valve opening speed of the closing valve 24 in the open state is set such that the opening amount of the closing valve 24 is increased by the predetermined amount at the cycle longer than the control cycle of the feedback control of the air-fuel ratio of the engine. However, the valve opening speed can be changed in view of a purge amount. That is, when the purge amount is large, the valve opening speed may be corrected to be lower than a case where the purge amount is small.

What is claimed is:

1. A fuel vapor processing apparatus comprising:
   an adsorbent canister filled with an adsorbent;
   a vapor path connecting the adsorbent canister to a fuel tank;
   a flow control valve disposed in the vapor path and comprising a valve body and a valve seat; and
   a control unit connected to the flow control valve;
   wherein the flow control valve is configured to remain closed while a movement distance of the valve body relative to the valve seat from a predetermined initial position toward a valve opening direction is less than a predetermined distance;
   wherein the flow control valve is further configured such that under a condition where the movement distance of the valve body is greater than the predetermined distance, the flow control valve is open, and an opening amount of the flow control valve increases in response to an increase in the movement distance of the valve body; and
   wherein the control unit is configured to set a valve opening speed of the flow control valve at a start of valve opening to a first speed under a condition where the movement distance of the valve body from the predetermined initial position is less than the predetermined distance, and to set the valve opening speed of the flow control valve to a second speed lower than the first speed under a condition where the movement distance of the valve body from the predetermined initial position is greater than the predetermined distance.

2. The fuel vapor processing apparatus according to claim 1,
   wherein while the valve opening speed is set to the second speed, the opening amount of the flow control valve is increased by a predetermined amount at a cycle longer than a control cycle of a feedback control of an air-fuel ratio of an engine.

3. The fuel vapor processing apparatus according to claim 1, further comprising:
   a purge path connecting the adsorbent canister to an engine; and
   a purge valve disposed in the purge path;
   wherein the control unit is configured to increase the opening amount of the flow control valve by a predetermined amount at the cycle longer than a control cycle of a feedback control of an air-fuel ratio of the engine until the opening amount of the flow control valve reaches a target opening amount after the flow control valve is opened under a condition where the purge valve is open.

4. The fuel vapor processing apparatus according to claim 1,
   wherein the control unit is configured to keep the valve opening speed constant until the opening amount of the flow control valve reaches a target opening amount after the flow control valve is opened.

5. The fuel vapor processing apparatus according to claim 1,
   wherein the control unit is configured to change the valve opening speed in response to an air-fuel ratio of an engine until the opening amount of the flow control valve reaches a target opening amount after the flow control valve is opened; and
   wherein the valve opening speed under a condition where the air-fuel ratio is in a fuel rich state is lower than the valve opening speed under a condition where the air-fuel ratio is in a fuel lean state.

6. The fuel vapor processing apparatus according to claim 1,
   wherein the control unit is configured to set a valve closing speed of the flow control valve during closing the flow control valve for blocking the vapor path to be higher than the valve opening speed of the flow control valve under a condition where the flow control valve is open.

7. The fuel vapor processing apparatus according to claim 1,
   wherein the control unit is configured to set a valve closing speed of the flow control valve during closing the flow control valve for blocking the vapor path at a fixed speed regardless of whether the movement distance of the valve body from the predetermined initial position is less than the predetermined distance or not.

8. The fuel vapor processing apparatus according to claim 1, further comprising
   a step motor opening and closing the flow control valve;
   wherein the control unit is configured to control a rotation speed of the step motor in order to control the valve opening speed of the flow control valve.

9. A fuel vapor processing apparatus comprising:
   an adsorbent canister filled with an adsorbent;
   a vapor path connecting the adsorbent canister to a fuel tank;
   a flow control valve disposed in the vapor path; and
   a control unit connected to the flow control valve and configured to set a valve opening speed of the flow control valve at a start of valve opening such that an opening amount of the flow control valve is increased in a stepped manner by a predetermined amount at a cycle longer than a control cycle of a feedback control of an air-fuel ratio of an engine.

10. The fuel vapor processing apparatus according to claim 9, further comprising:
    a purge path connecting the adsorbent canister to an engine; and
    a purge valve disposed in the purge path;
    wherein the control unit is configured to increase the opening amount of the flow control valve by the predetermined amount at the cycle longer than the control cycle of the feedback control of the air-fuel ratio of the engine until the opening amount of the flow control valve reaches a target opening amount after the flow control valve is opened under a condition where the purge valve is open.

11. The fuel vapor processing apparatus according to claim 9,
wherein the control unit is configured to keep the valve opening speed constant until the opening amount of the flow control valve reaches a target opening amount under a condition where the flow control valve is open.

12. The fuel vapor processing apparatus according to claim 9,
wherein the control unit is configured to change the valve opening speed in response to an air-fuel ratio of an engine until the opening amount of the flow control valve reaches a target opening amount after the flow control valve is opened; and
wherein the valve opening speed under a condition where the air-fuel ratio is in a fuel rich state is lower than the valve opening speed under a condition where the air-fuel ratio is in a fuel lean state.

13. The fuel vapor processing apparatus according to claim 9,
wherein the control unit is configured to set a valve closing speed of the flow control valve during closing the flow control valve for blocking the vapor path to be higher than the valve opening speed of the flow control valve under a condition where the flow control valve is open.

14. The fuel vapor processing apparatus according to claim 9, further comprising
a step motor opening and closing the flow control valve;
wherein the control unit is configured to control a rotation speed of the step motor in order to control the valve opening speed of the flow control valve.

* * * * *